United States Patent [19]

Itou et al.

[11] Patent Number: 4,758,898
[45] Date of Patent: Jul. 19, 1988

[54] VIDEO SIGNAL RECORDING AND REPRODUCING APPARATUS

[75] Inventors: Kouji Itou, Osaka; Kazuo Shimomura, Hirakata, both of Japan

[73] Assignee: Sanyo Electric Co., Ltd., Moriguchi, Japan

[21] Appl. No.: 759,972

[22] Filed: Jul. 29, 1985

[30] Foreign Application Priority Data

Jul. 30, 1984 [JP] Japan .............................. 59-159726
Sep. 20, 1984 [JP] Japan .............................. 59-198216
Sep. 27, 1984 [JP] Japan .......................... 59-146159[U]

[51] Int. Cl.⁴ .............................................. H04N 9/89
[52] U.S. Cl. .................................. 358/320; 358/315
[58] Field of Search .............. 358/310, 315, 320, 328, 358/329; 360/9.1, 23, 32

[56] References Cited

U.S. PATENT DOCUMENTS

| 4,597,019 | 6/1986 | Nishimoto et al. | 358/320 |
| 4,616,270 | 10/1986 | Nishimoto | 358/320 |
| 4,626,927 | 12/1986 | Hirota et al. | 358/310 |
| 4,626,929 | 12/1986 | Ichinoi et al. | 358/320 |

*Primary Examiner*—Donald McElheny, Jr.
*Attorney, Agent, or Firm*—Armstrong, Nikaido, Marmelstein and Kubovcik

[57] ABSTRACT

The present invention relates to a color difference signal processing circuit of a video tape recorder (VTR) by a timeplex system. The hue of the picture face is adapted not to change with variation in amplitude and variation in DC level during the reproduction of the tape recorded by the VTR.

6 Claims, 8 Drawing Sheets

VIDEO SIGNAL RECORDING AND REPRODUCING APPARATUS

BACKGROUND OF THE INVENTION

1. Field of the Invention

The present invention relates to a video signal recording and reproducing apparatus, wherein conversion video signals are formed, in which brilliance signals and color difference signals have been inserted by time sharing during each one horizontal period. The brilliance signals and the color difference signals are compressed in the time axis through the respective time axis compressing and time-sharing inserting operations of the brilliance signals, including the synchronizing signals and the color difference signals of the recording video signals, during the recording operation. The conversation video signals are recorded on a record medium. The brilliance signals, including the synchronizing signals and the color difference signals of the video signals reproduced from the record medium, are respectively extended in the time axis during the reproducing operation. The brilliance signals, the color difference signals which are the same in the time axis as the brilliance signals, and the color difference signals of the recording video signals are respectively reproduced and formed during each one horizontal period so as to effect the output operation.

2. Description of the Prior Art

Conventionally in a video tape recorder of a timeplex system, which is one example of this type of video signal recording and reproducing apparatus, the brilliance signal of each one horizontal period (hereinafter the horizontal period is referred to as H), including the synchronizing signal of the video signal to be recorded, is compressed in the time axis to 4/5 during the recording operation. Two types of color difference signals of R—Y, B—Y (R; red color signal, B; blue color signal, Y; brilliance signal) of the video signal to be recorded are compressed in the time axis to 1/5 alternately for each 1 H. In addition, the conversation video signals, in which the brilliance signal is compressed in the time axis to 4/5 and the color difference signal of the R—Y or B—Y is compressed in time axis to 1/5, are inserted by time sharing in each 1 H, i.e., timeplex signals are formed through the time-sharing inserting operation of the brilliance signal compressed in the time axis to 4/5 and of the color difference signal of the R—Y or B—Y compressed in the time axis to 1/5. The timeplex signals are recorded on a tape which is a recorded medium.

Also, during the reproducing operation, the brilliance signal and the color difference signal, compressed in the time axis, of the video signals obtained by the reproduction of the tape, namely, the reproduction timeplex signals which are the reproduced video signals, are respectively extended in the time axis. The output brilliance signal and output color difference signal, which are the same in the time axis as the recording brilliance signal and the recording color difference signal of the recording video signals, are respectively reproduced and formed in each 1H to perform the output operation.

In the above described time axis compression and time sharing inserting operation, time axis extending operation are digitally performed by the use of an A/D converter, memory, D/A converter, etc. In this case, an analog filter or the like is not used as in the convention video tape recorder so that no interference is provided between the brilliance signal and the color difference signal so as to improve the S/N and to resolve the degree of the color recording and reproducing.

When the digital time-axis compressing operation is performed, the brilliance signal and the color difference signal are respectively converted in an A/D generally in accordance with a given speed of a clock signal. The brilliance and the chroma data provided by the A/D conversion are respectively written in the memory and are once retained. The brilliance and chroma data are respectively read from the memory in accordance with the clock signal which has a speed higher than the given speed and are converted in the D/A to provide the brilliance signal and the color difference signal compressed in the time axis with a compression rate established by the speed difference between the stored clock signal of the memory and the reading clock signal.

In a video tape recorder of the above described timeplex system, the brilliance signal and the color difference of each 1 H of the video signals to be recorded by the clock signals of 16 MHz, 4 MHz during the recording operation are respectively converted in an A/D to respectively form the brilliance data and the chroma data. The brilliance data of each 1H are stored in a random access memory (hereinafter referred to as RAM) on the brilliance side by the clock signal of 16 MHz. The chroma data of the R—Y or the B—Y of each 1 H is stored for each 1 H in the RAM on the chroma side by the clock signal of 4 MHz.

It is to be noted that the chroma data of the R—Y, B—Y of each 1 H in the video signal to be recorded are stored, in the RAM on the chroma side, alternately for each 1 H.

In addition, the RAM on the side of the brilliance data is read by the clock signal of 20 MHz. The time-axis compressing operation is effected, at a ratio between the storing clock signal of the RAM on the brilliance data side and the reading clock signal. The time axis of the brilliance signal of the video signal to be recorded is compressed into the 4/5.

Also, the RAM on the chroma data side is read by the clock signal of 20 MHz after the storing operation. The time axis compressing operation is effected, at a ratio between the storing clock signal of the RAM on the side of the chroma data and the reading clock signal, and the time axis of the color difference signal in the video signal to be recorded is compressed into the 1/5.

It is to be noted that the reading operation of the chroma data becomes a blanking period of the brilliance signal and that the brilliance data and the chroma data are sequentially read in each 1 H.

The brilliance data and the chroma data which were read in each 1H and the achromatic level data which was secured to the level of 50 IRE are composed by the time-sharing inserting operation, in the order of the brilliance data, the achromatic level data, the chroma data are converted in the D/A by the clock signal of 20 MHz. The brilliance signal of 1 H, which has been compressed in the time axis 4/5, the achromatic level signal, and the color difference signal of R—Y or B—Y compressed in time axis to 1/5, have been inserted by time sharing in each 1 H, so the timeplex signal is formed.

Figure 7:
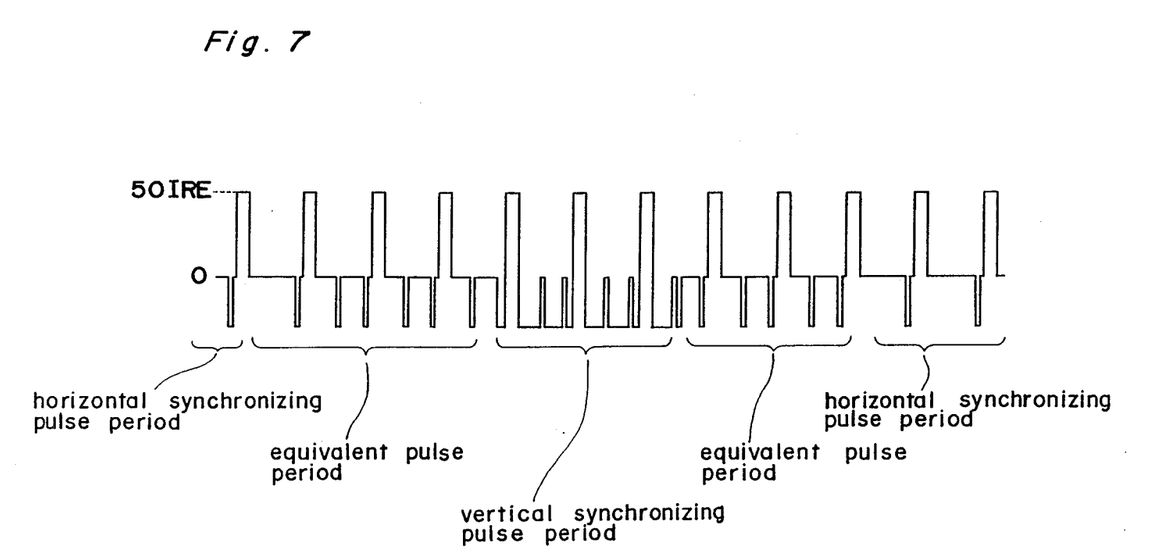
FIG. 7 is a waveform chart showing a vertical synchronizing signal portion of a conventional timeplex signal waveform.

It is to be noted that the formed timeplex signal is compressed in the time axis even in the synchronizing signal portion of the brilliance signal. The waveform of the vertical synchronizing signal portion becomes one wherein the achromatic level signals of 50 IRE are piled up, as shown in FIG. 7, respectively for a horizontal synchronizing pulse period, an equivalent pulse period, and a vertical synchronizing pulse period. The reference character 0 in the drawing shows a pedestal level.

On the other hand, the digital time axis extending operation is required to be processed reversely to the time axis compressing operation. In the case of the video tape recorder of a timeplex system, the brilliance signal and the color difference signal, compressed in time axis, of regenerative timeplex signals are respectively converted in the A/D by the clock signal of 20 MHz and thereafter are stored respectively in the RAM on the brilliance data side and in the RAM on the chroma data side by the clock signal of 20 MHz.

Furthermore the RAM on the side of the brilliance data is read by the clock signal of 16 MHz, the RAM on the chroma data side is read by the clock signal of 4 MHz. The data which has been read from both the RAMs are respectively converted in the D/A. The time axis of the brilliance signal and the color difference signal to be converted in A/D are respectively extended into 5/4, 5 times. The brilliance signal and the color difference signal, which is the same in the time axis as the brilliance signal and the color difference signal of the video signals to be recorded are reproduced and formed in each 1 H.

The various timings such as the storing and reading timings in the RAMs on the brilliance data side and the chroma data side during the recording time and the reproducing time are determined with the respective horizontal synchronizing signals of the recorded video signal and the reproduced video signal used as a reference. In this case, the various clock signals, such as a clock signals of both the RAMs, are formed in correctly synchronous relation with the phases of the respective horizontal synchronizing signal of the recorded video signal and the reproduced video signal. The variable control operation is required from 16 MHz or 4 MHz to 20 MHz, from 20 MHz to 16 MHz or 4 MHz at a given timing with the horizontal synchronizing signal as a reference.

There is a timeplex system as one of the recording systems of picture signals in which the brilliance signal, such as SECAM and PAL signals, is compressed in the time axis to 4/5 or the color difference signal is compressed in the time axis to 1/5 so that both signals are inserted within one horizontal period during time staring, and both signals are FM modulated and are recorded on a magnetic tape. It is to be noted that this timeplex system is described at pages 134 through 138 of the November issue, 1983 in Radio Wave Science (Japanese Broadcast Publication Association Issue).

However, in the above-described convention example, the level of the color difference signal to be obtained changes, when the signal during the reproduction is different in amplitude and DC level during the recording operation, to change the hue of the reproduction picture face.

The Radio Wave Science, Nov. 11, 1983 describes the provision of a digital synchronism detaching circuit at pages 134 through 138 for the recording and reproducing operations of the above-described timeplex system. In this case, the horizontal and vertical synchronizing signals are detected to perform the synchronizing detaching operation. The signals are detached from the digital conversion signals of the brilliance signals among the video signals to be recorded and the video signals reproduced, by the digital synchronism detaching circuit. The various clock signals, such as clock signals on the RAMs, on the brilliance data side and on the chroma data side in accordance with the horizontal synchronizing signal, is obtained by the synchronism detachment.

When the horizontal and vertical synchronizing signals are detected from the digital conversion signals of the brilliance signals, of the video signals to be recorded and the reproduced video signals, and are detached in synchronism by the use of the digital synchronism detachment circuit, the sampling space of the A/D conversion for forming the digital conversion signal is limited. In this case, one sampling space, i.e., about one clock period of detection timing shift may be cause for each 1H.

The detection timing shift varies the edge of the synchronizing signal to be detached in synchronism and changes as the edge varies the clock signal.

Furthermore, when the color difference signal is sampled with 4 MHz in this circuit construction, the step of the shift register becomes 52 $\mu s \div \frac{1}{4}$ MHz=208, when the scanning period is 52 $\mu s$, thus requiring 208 steps. As the quantization number of the color difference signal is generally 6 bits, a shift register of a great number of elements is required in such a circuit construction thus resulting in higher circuit cost and more consumption of power.

SUMMARY OF THE INVENTION

According to the present invention, in a video signal recording and reproducing apparatus, the brilliance signals, including the synchronizing signal, and the color difference signals of the video signal to be recorded during the recording operation are respectively compressed in the time axis and inserted by time sharing, in accordance with clock signals controlled in a synchronous relation with the phases of the respective synchronizing signals of the video signals to be recorded. The conversion video signal is recorded on the recording medium. The brilliance signals and the color difference signals, including the synchronizing signal of the reproduced video signal which has been provided by the reproduction of the medium during the reproducing operation, are respectively extended in the time axis. The brilliance signals and the color difference signals, which are the same in the time axis as the brilliance signals and the color difference signals of the video signals to be recorded, are respectively reproduced in each 1 horizontal period and are put. An A/D converter is provided for inputting the reproduced video signals. A latch circuit is provided for storing the achromatic signal level of the A/D converter output. A subtracting means is provided for providing the difference between the A/D converter output and the latch circuit output. The A/D converter, latch circuit and subtracting means are provided as a color difference signal processing circuit so that the latch level of the achromatic signal is subtracted from the digital value of the timeplex color difference signal. The respective changes in the amplitude and the DC level provided by the reproduction of the medium during the reproducing operation are mutually offset to provide the correct color difference signal so that the variations of the hue will not occur when reproduced.

Also according to the present invention, an analog synchronism detaching circuit, instead of the digital synchronism detaching circuit, is used so that the respective horizontal and vertical synchronizing signals of the video signals to be recorded and the reproduced video signals are detected without being converted in the A/D. In this case, the shift of the detection timing, because of the sampling interval when the digital synchronism detaching circuit is used, is prevented.

On the other hand, in a case where the analog synchronism detaching circuit is simply provided, it becomes difficult for the reproduction timeplex signal, such as the reproduced video signal, to detect the horizontal and vertical synchronizing signals and to detach them in synchronism during the reproduction operation, because the achromatic level signals are piled upon the vertical synchronizing signal portion, as referred to in FIG. 7. However, in this invention, the time axis compressing and the time-sharing inserting of the vertical synchronizing signal portion of the brillance signal of the video signals to be recorded are stopped ruing the recording time. The brilliance signal of the video signals to be recorded is output as is so that the vertical synchronizing signal of the conversion video signal is formed by the vertical synchronizing signal portion of the video signal to be recorded. In this case, the horizontal and vertical synchronizing signals are correctly detected by the analog synchronism detaching circuit during the reproducing operation to perform the synchronism detachment.

As the horizontal and vertical synchronizing signals of the video signals are to be recorded, the reproduced video signals are detected correctly and stably through the use of the analog synchronism detaching circuit without detection shift. The edges of the horizontal and vertical synchronizing signals detached in synchronism are prevented from being varied. The clock signals are used in the time axis compressing and time-sharing inserting operations during the recording operation. The time-axis extending operation is used during the reproducing operation and is controlled in synchronism by the phase of the horizontal synchronizing signal detached correctly and stably in synchronism and is variably controlled. The time-axis compressing and time-sharing operations, during the recording operation, and the time axis extending operation, during the reproducing operation, are correctly and stably performed.

Furthermore, in the present invention, a color signal processing circuit has the two color difference signals of the color signal into which two color difference signals are compressed in a given period with the horizontal synchronizing signal as a time reference and are alternately inserted for each 1 H. An indicating signal, which indicates the type of the color difference signal, is also inserted. The two color difference signals are rendered simultaneous and processed. Two memories are used to process the two color difference signals. A first memory is used for storing a first color difference signal and a second memory is used for storing a second color difference signal. Linearly subsequent compression color different signals are alternately stored in these memories at a high speed for each 1 H by the output of a means for identifying the type of the color difference signal of the line. The low speed reading of two memories are simultaneously performed to render the color difference simultaneous.

BRIEF DESCRIPTION OF THE DRAWINGS

The objects and features of the present invention will become apparent from the following description taken in conjunction with the preferred embodiment thereof with reference to the accompanying drawings in which;

FIG. 1 through FIG. 3 show one embodiment of a video signal processing apparatus of the present invention.

DESCRIPTION OF THE PREFERRED EMBODIMENTS

Before the description of the present invention proceeds, it is to be noted that like parts are designated by like reference numerals throughout the accompanying drawings.

The present invention will be described in detail with reference to FIG. 1 through FIG. 4 showing one embodiment.

Figure 1:
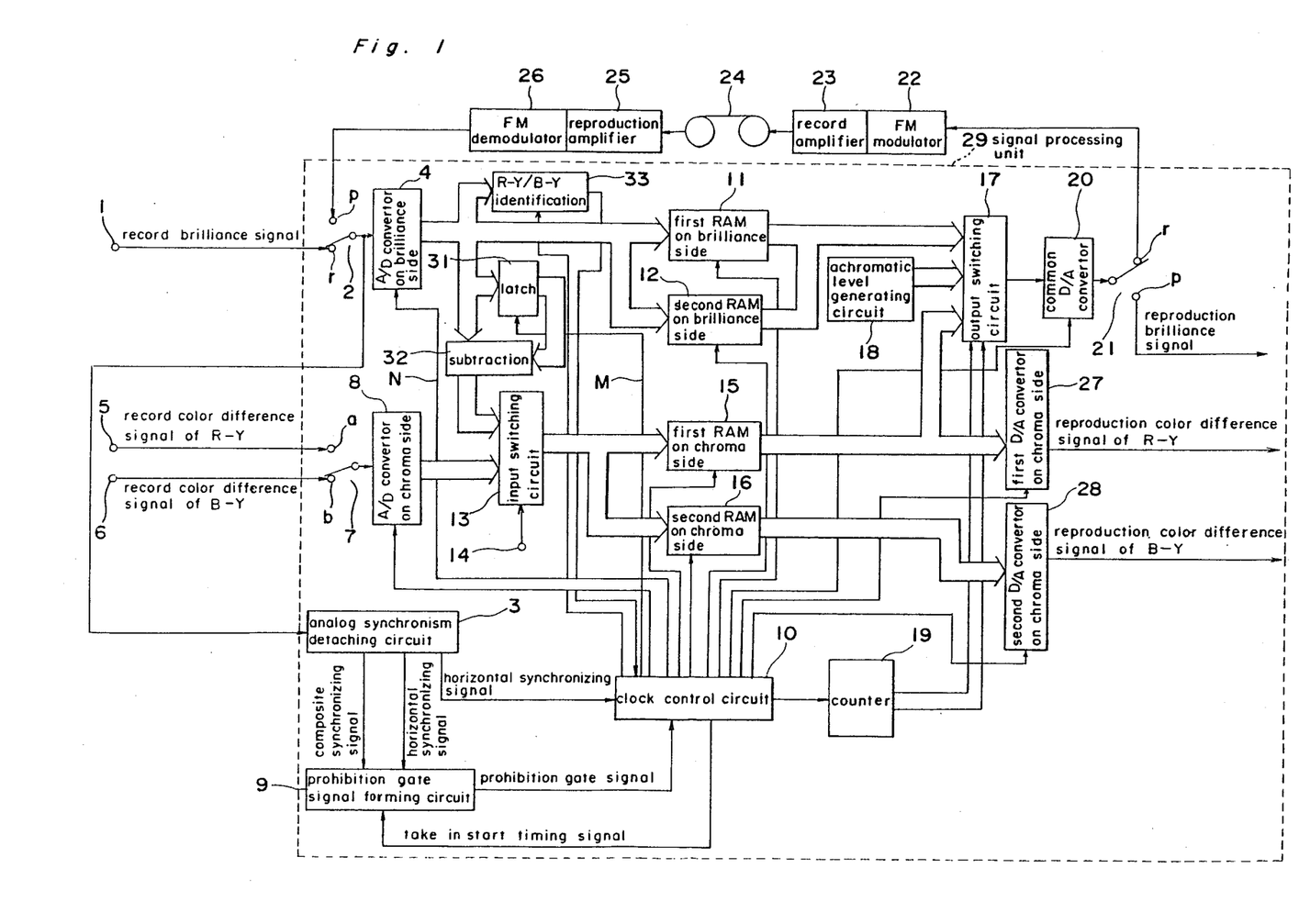
FIG. 1 is a block diagram.

During the recording operation, the brilliance signals (hereinafter referred to as record brilliance signal) including the synchronizing signal of the video signals to be recorded, as shown in FIG. 1, are input into an analog synchronism detaching circuit 3 and an A/D converter 4 on the side of the brilliance data through the record contract r of a record rechange-over first switch 2 from the brilliance input terminal 1.

Also, the color difference signals (hereinafter referred to as record color difference signals of R−Y, B−Y) of R−Y, B−Y of the video signals to be recorded are respectively input into a pair of contacts a, b of the chroma change-over switch 7 through the first and second chroma input terminals 5, 6. At this time, the switch 7 is alternately switched into contacts a, b for each 1 H of the video signals to be recorded, so that the record color difference signals of R−Y, B−Y through the switch 7 are alternately input for each 1 H into the A/D converter 8 on the side of the chroma data.

The horizontal and vertical synchronizing signals of the video signals to be recorded by the synchronism detaching circuit 3 are detected without the A/D conversion. The input signals are detached in synchronism. The horizontal synchronizing signals provided by the synchronism detachment are output into a prohibition gate signal forming circuit 9 and a clock controlling circuit 10 from the synchronism detaching circuit 3. Composite synchronizing signals, with the horizontal and vertical synchronizing signals being mixed therein, are output into a forming circuit 9.

Figure 2:
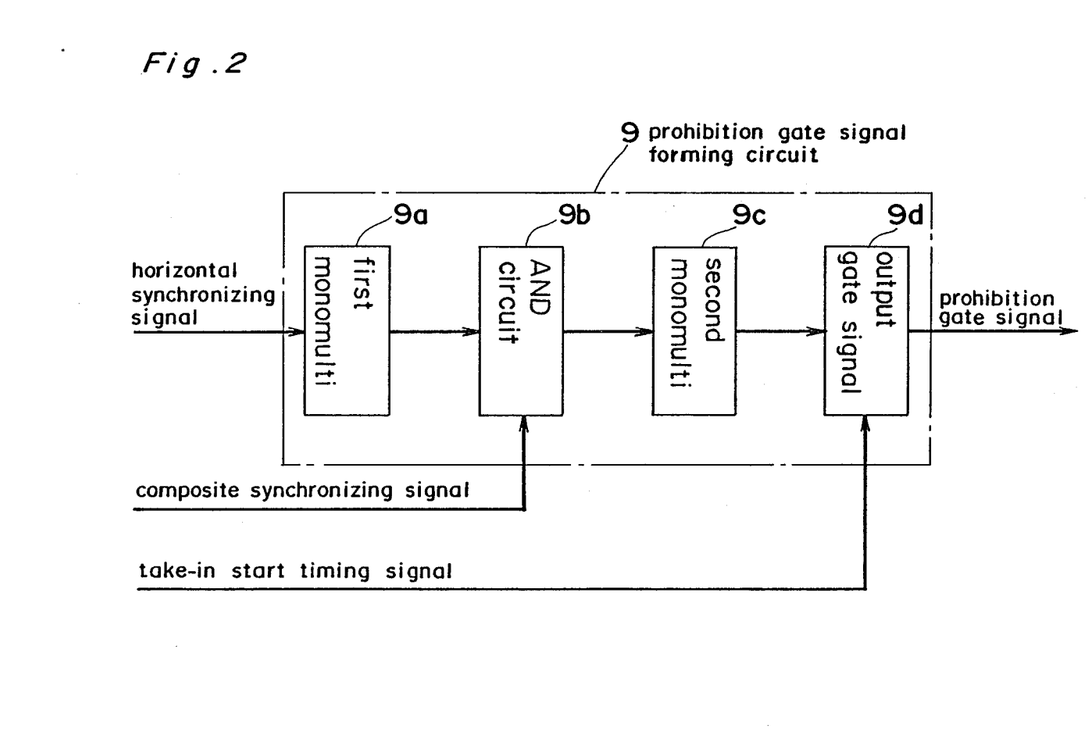
FIG. 2 is a detailed block diagram of one portion of FIG. 1, FIGS. 3A and 3B show timing charts, (a) through (g), for describing the operation of FIG. 2.

Furthermore, the forming circuit 9 is composed as shown in FIG. 2. The horizontal synchronizing signal from the synchronism detaching circuit 3 shown in FIG. 3A(a) is input into a first monomulti 9a. The monomulti 9a is triggered by the falling of the horizontal synchronizing signal so that a first monomulti pulse of a period Ma, which is longer than 1 H/2 and shorter than 1 H from the falling of the horizontal synchronizing signal, is output from the monomulti 9a to an AND circuit 9b.

Figure 3A:
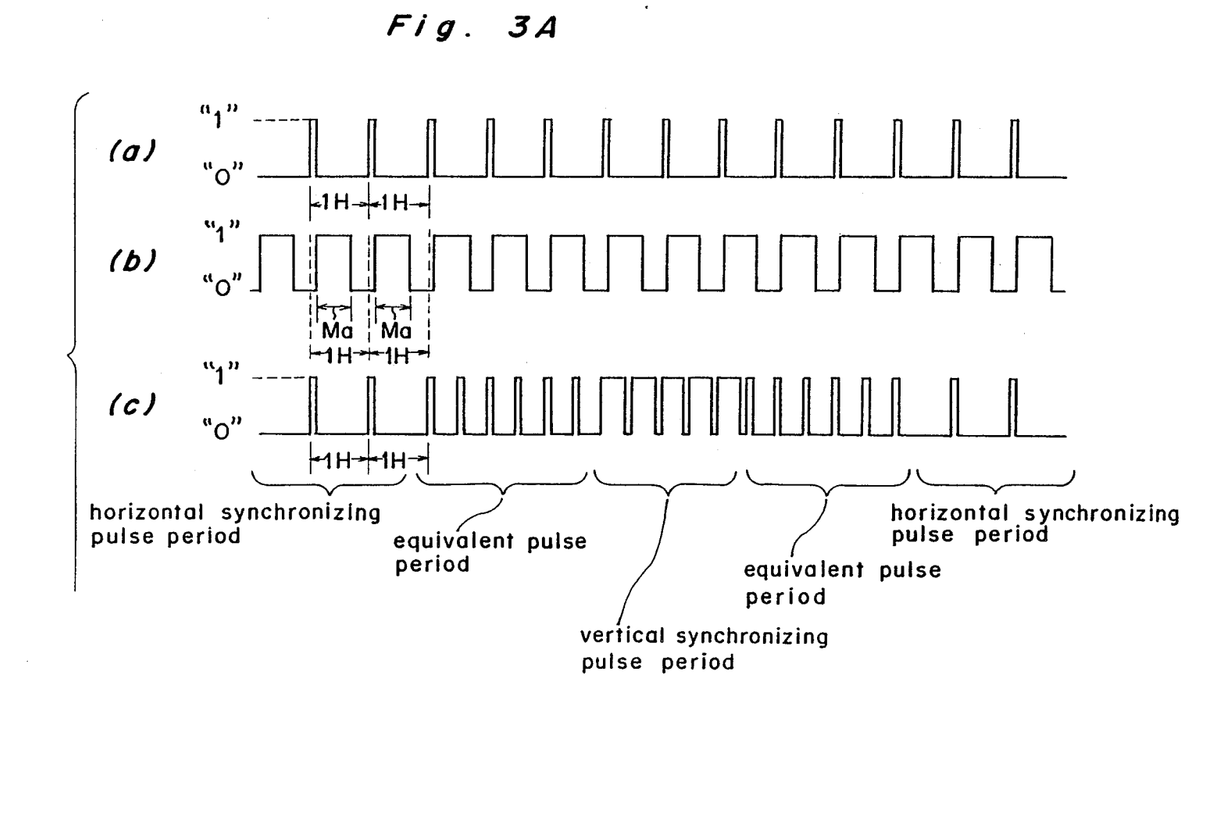
Figure 3B:
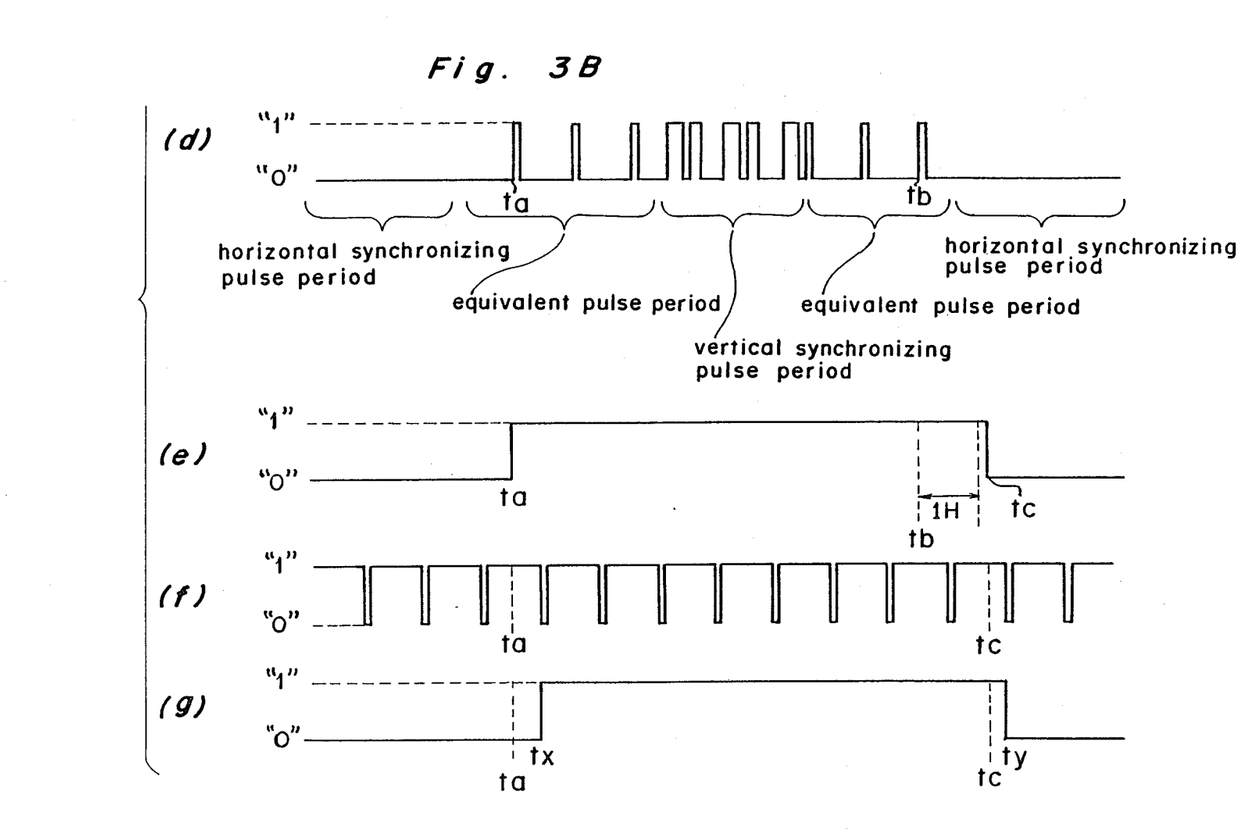

Also, a composite synchronizing signal from the synchronism detaching circuit 3 shown in FIG. 3A(c) is input into the AND circuit 9b. The logical product of the first monomulti pulse and the composite synchronous signal is operated by the AND circuit 9b and an AND gate signal wherein the pulse of the logic 1 (hereinafter referred to as "1") exists only during an equivalent pulse period. A vertical synchronizing pulse period, as shown in FIG. 3B(d), is output from the AND circuit 9b to a second monomulti 9c which can be retriggered.

It is to be noted that the composite synchronizing signal is composed of a vertical synchronizing pulse period in which six wide vertical synchronizing pulses for each 0.5 H exists, front and rear equivalent pulse periods of the vertical synchronizing pulse period in which the narrow six equivalent pulses for 0.5 H exist, a horizontal synchronizing pulses period in which the horizontal synchronizing pulse for each 1 H exist during each vertical period, the vertical synchronizing signal being formed of each vertical synchronizing pulse of the vertical synchronizing pulse period, and the horizontal synchronizing signal of FIG. 3A(b) is formed of the pulse for each 1 H of each pulse period. FIG. 3A(c) shows a vertical synchronizing pulse period portion.

Also, the AND gate signal to be input to a second monomulti 9c becomes 1 H or lower in pulse space in the equivalent pulse period and the vertical synchronizing pulse period.

The second monomulti 9c is triggered for each rise of the AND gate signal. At this time, the metastable period of the second monomulti 9c is set in a period a little longer than 1 H. A second monomulti pulse, in which "1" is provided during a time period, as shown in FIG. 3B(e), from a time ta when an AND gate signal rises at first to a time tc after the metastable period of the second monomulti 9c from the lastly rising time tb, is output to a gate signal output circuit 9d the second monomulti 9c.

In addition, a timing signal from a clock controlling circuit 10, i.e., a take-in start timing signal, which is a horizontal synchronizing signal, of FIG. 3A(a), reversed as shown in FIG. 3B(f), is input, together with the second monomulti pulse, into a gate signal output circuit 9d. A prohibition gate signal, in which "1" is provided for a period from the falling of the take-in start timing signal to the next rising of the second monomulti pulse to the falling of the take-in start timing signal to the next falling of the second monomulti pulse, that is to say, only during a prohibition period which prohibits the compression and extension to a time ty after the time tc from a time tx after the time ta as shown in FIG. 3B(g), is formed by the output circuit 9d. The prohibition gate signal is output from the output circuit 9d to the control circuit 10.

It is to be noted that the take-in start timing signal is a signal showing a start timing of the compression and extension. A period of the compression and the extension is set by the time from the rising of the leading edge of the horizontal synchronizing signal. Also, the prohibition gate signal becomes "1" in the vertical synchronizing signal portion composed of an approximate vertical synchronizing pulse period and the front and rear equivalent pulse period of the period.

A controlling circuit 10 is provided with a PLL controlling circuit and so on, to which a horizontal synchronizing signal is input, to form the various clock signals synchronized with the phase of the horizontal synchronizing signal. A clock signal of 16 MHz is output into an A/D converter 4 and a clock signal of 4 MHz is output into an A/D converter 8.

It is to be noted that a clock signal for changing over a switch 7 is also formed by the controlling cirucit 10. The switch 7 is changed over by the clock signal.

The record brilliance signal is converted in an A/D with a sampling frequency of 16 MHz by the A/D converter 4. The digital data of the record brilliance signal, i.e., the record brilliance data are output into first and second RAMs 11, 12 on the side of the brilliance data and an input switching circuit 13 from the A/D converter 4.

Also, the record color difference signals of R−Y, B−Y are alternately converted in an A/D with the sampling frequency of 4 MHz by the A/D converter 8. The digital data of the record color difference signal of the R−Y, B−Y, i.e., the record chroma data are alternately output into the input switching circuit 13.

The input switching circuit 13 selectively outputs the data of the A/D converter 8 during the recording operation in accordance with the mode signal from a system controlling circuit through a switch signal input terminal 14.

Accordingly, the record chroma data of the A/D converter 8 are output into the first and second RAMs 15, 16 on the chroma data side through the input switching circuit 13 during the recording operation.

The clock signals from the controlling circuit 10 are respectively input into the first and second RAMs 11, 12 on the brilliance data side and the first and second RAMs 15, 16 on the chroma data side. During the recording operation, the first and second RAMs 11, 12 on the side of the brilliance data are reciprocally controlled into storing and reading for each 1 H, and the first RAM 15 on the side of the chroma data is controlled alternately into storing and reading during the 1 H.

The controlling circuit 10 varies the clock signals output into the first and second RAMs 11, 12 from 16 MHz when stored, to 20 MHz when read while the prohibition gate signal during the recording operation is a logic 0 (hereinafter referred to as "0"), i.e., during the non-output period of the prohibition gate signal. The controlling circuit 10 varies the clock signal output into the first RAM 15 on the side of the chroma data to 4 MHz when stored, to 20 MHz when read.

The record brilliance data compressed in the time axis to 4/5 are alternately read for each 1H from the first and second RAMS 11, 12. The record chroma data compressed in the time axis to 1/5 are read during a blanking period of the record brilliance signal.

In addition, the record brilliance data, alternately read from the first and second RAMs 11, 12 on the side of the brilliance data, and the record chroma data, read from the first RAM 15 on the side of the chroma data, are input into an output switching circuit 17. The achromatic level data of 50 IRE from the achromatic level producing circuit 18 is input into the output switching circuit 17. It is to be noted that the achromatic level data are the achromatic signals of the 50 IRE.

Also, a pair of output signals of a ternary counter 19 are input into the output switching circuit 17. The digital control signals from the controlling circuit 10 are input into the counter 19.

The counter 19 becomes 0 in its digital contents while the record brilliance data is output in a non-output period of the prohibition gate signal in accordance with a digital control signal. The counter 19 becomes 1 in its digital contents in a period from the output completion of the record brilliance data to the start of the output of chroma data. The counter 19 becomes 2 in its digital contents during the recording of chroma data.

Also, the output switching circuit 17 selectively outputs the data read from the first and second RAMS 11, 12 on the side of the brilliance data while the digital contents of the counter 19 is 0 in accordance with a pair of digital control signals of the counter 19. The output switching circuit 17 selectively outputs the achromatic level data while the digital contents of the counter 19 is 1. The output switching current 17 selectively outputs the data read from the first RAM 15 on the side of the chroma data while the digital contents of the counter 19 is 2.

During the non-output period of the prohibition gate signal during the recording operation, the record brilliance data, the achromatic data, and the record chroma data, respectively compressed in the time axis, are sequentially output for each 1 H into a common-use D/A converter 20 from the output switching circuit 17. At this time, the D/A converter 20 converts in the D/A the record brilliance data, the achromatic data, and the record chroma data in accordance with the clock signal of 20 MHz output from the control circuit 10. The converter outputs a conversion video signal, i.e., a timeplex signal similar to the conventional one. The conversion video signal into which the record brilliance signal of 1 H, compressed in the time axis to 4/5, and the color difference signal of R−Y or B−Y, compressed in the time axis to 1/5, have been inserted using time sharing for each 1 H.

As the timeplex signal of the D/A converter 20 is input into a record rechange-over second switch 21, and the second switch 21 is changed over into a record contract r during the recording operation, the timeplex signal of the second switch 21 is input into an FM modulator 22 through the complex r. The timeplex signal is modulated in FM because of the record by the modulator 22. A modulation timeplex signal which is an FM modulated timeplex signal is output onto the tape 24, which is a record medium, through a record amplifier 23 from the modulator 22 so that the modulated timeplex signal is recorded on the tape 24. The changes, with respect to the frequency 20 MHz, of the clock signal to be output to the first and second RAMS 11, 12 on the side of the brilliance data during the reading operation in the controlling circuit 10, are controllingly prohibited in a period of the vertical synchronizing signal portion during which a prohibition gate signal "1"0 is output, i.e., in an output period of the prohibition gate signal. The frequency of the clock signal to be output to the first and second RAMs 11, 12 on the side of the brilliance data is controlled by 16 MHz which is a stop frequency of the time axis compression and the time sharing, i.e., by the frequency of the clock signal of the A/D converter 4 during the writing operation and the reading operation. The digital instruction signal to be output into the counter 19 is controlled by a reset siganl of the digital contents.

The time axis compressing operation of the record brilliance data by the first and second RAMs 11, 12 is stopped during the output period of the prohibition date. The record brilliance data of the time axis non-compression are output into the output switching circuit 17 from the first and second RAMs 11, 12. The output switching circuit 17 is retained by the selection outputs of the first and second RAMs 11, 12 in accordance with the reset of the counter 19 to stop the time sharing. The record brilliance data of the non-compression are output into the D/A converter 20 from the output switching circuit 17. The record brilliance signal input into the A/D converter 4 is output as is from the D/A converter 20.

As the record brilliance signal, during the output period of the prohibition gate signal, becomes the signal of the vertical synchronizing portion of the video signal to be recorded, i.e., the signal of the vertical synchronizing pulse, the equivalent pulse, the timeplex signal is formed of the signal of the vertical synchronizing signal portion of the video signal to be recorded during the output period of the prohibition gate signal.

Accordingly, the vertical synchronizing signal portion of the video signal to be recorded is recorded, as is, on the tape 24 in a non-compressed state. The portion, except for the vertical synchronizing signal portion, is recorded by the time axis compressing and the time sharing operations of the record brilliance signal and the record color difference signal as before.

The reproduction will be described hereinafter. The reproduction signal of the tape 24 is input into an FM demodulator 26 through a reproduction amplifier 25. The reproduced video signal to be provided by the FM demodulation of the reproduction signal is output into the reproduction contact p of the first switch 2 from the demodulator 26. As the first switch 2 is changed over into a reproduction contact p at this time, the reproduced video signals are input into the synchronism detaching circuit 3 and the A/D converter 4.

The synchronism detachment is performed as the horizontal and vertical synchronizing signals, of the video signals reproduced by the synchronism detaching circuit 3, are detected. The vertical synchronizing portion of the video signals reproduced at this time becomes the same in waveform as the vertical synchronizing portion of the record brilliance signal, i.e., the same in waveform as the vertical synchronizing signal portion of the normal video signal.

Accordingly, the edge of the vertical synchronizing signal is detected by the synchronism detaching circuit 3 to allow the horizontal and vertical synchronizing signals to be detected and to be detached in synchronism. In this case, the horizontal and vertical synchronizing signals may be correctly and stably detached in synchronism without causing the shift in such a detection timing as in the use of the digital synchronism detaching circuit.

A horizontal synchronized signal detached in synchronism by the synchronism detaching circuit 3, i.e., the horizontal synchronizing signal of the video signal reproduced, is input into the controlling circuit 10. A composite synchronizing signal and a horizontal synchronizing signal of the reproduced video signals are output into a forming circuit 9 from the synchronism detaching circuit 3.

Although the brilliance signal of the reproduction video signal is compressed in the time axis to 4/5, the horizontal synchronizing signal becomes the same in the pulse distance as during the record period, because only the brilliance signal of 1 H exists for each 1 H.

Furthermore, the forming circuit 9 operates as in the recording operation to output into a controlling circuit 10 a prohibition gate signal, which becomes "1" in the vertical synchronizing signal portion of the reproduced video signal.

The controlling circuit 10 forms various kinds of clock signals which are synchronized in phase with the input horizontal synchronizing signals. The circuit 10 turns the clock signals into 20 MHz to be outputted into the A/D converter 4, while the prohibition gate signal is "0", i.e., during a non-out period of the prohibition gate signal.

Accordingly, the reproduced video signal is sampled at the same sampling speed as in the D/A conversion of the D/A converter 20 during the recording operation and is converted into A/D. The output reproduction brilliance data, the output achromatic level data and the output reproduction chroma data are respectively similar to the record brilliance data, the achromatic level data and the record chroma data to be input into the D/A converter 20 during the recording operation. All the output data are output into the first and second RAMS 11, 12 on the side of the brilliance data, and the input switching circuit 13 for each 1H in the same sequence as during the recording operation.

As the input switching circuit 13 selectively outputs the data of the A/D converter 4, in accordance with a mode signal through an input terminal 14, during the reproducing operation, the data similar to those input into the first and second RAMS 11, 12 on the side of the brilliance data are input into the first and second RAMs 15, 16.

In addition, the first and second RAMs 11, 12 on the side of the brilliance data are controlled, reciprocal to the storing and reading operations for each 1 H of the reproduced video signal. The clock signal from the controlling circuit 10 becomes 20 MHz only during the 4/5 period of each 1 H, during which the brilliance data are input, in each 1H controlled in the storing operation. The clock signal from the controlling circuit 10 is varied into 16 MHz in each 1 H controlled in the reading operation.

Also, in the first and second RAMs 15, 16 on the side of the chroma data, the clock signals to be input from the controlling circuit 10 becomes 20 MHz alternately for each 1 H only in a period, in which the chroma data of each 1 H of the reproduced video signal are input. The clock signals to be input in the other periods are varied into 4 MHz.

In the first and second RAMs 11, 12 on the side of the brilliance data, the reproduction brilliance data are alternately stored for each 1 H. The stored reproduction brilliance data are alternately extended into 5/4 for each 1 H and read. The reproduction brilliance data extended in the time axis, i.e., in the same time axis of the record brilliance data output from the A.D converter 4 during the recording operation, are alternately output into the output switching circuit 17 from the first and second RAMs 11, 12.

Also, in the first and second RAMs 15, 16 on the side of the chroma data, the reproduction chroma data are alternately stored for each 1 H. The chroma data stored are extended five times as much and are repeatedly read two times during the 2 H. At this time, the reproduction chroma data of the R−Y, in accordance with the color difference signal of such an R−Y, is stored in the first RAM 15. The reproduction chroma data of the B−Y, in accordance with the color difference signal of such a B−Y, are stored in the second RAM 16. The reproduction chroma data of the R−Y, B−Y extended in the time axis, i.e., in the same time axis of the record chroma data output from the A/D converter 8 during the recording operation, are repeatedly output twice respectively into the first and second D/A converters 27, 28 on the side of the chroma data from the first and second RAMs 15, 16.

The digital contents of the counter 19 is retained at 0 in accordance with the digital instruction signal during the reproduction operation. The output switching circuit 17 is retained at the selection output of the data read from the first and second RAMs 11, 12 on the side of the brilliance data side. The reproduction brilliance data read from the first and second RAMs 11, 12 are input into the D/A converter 20.

The clock signal to be output into the D/A converter 20 from the controlling circuit 10, is controlled at 16 MHz during the reproduction time. The frequency of the clock signal to be output into the D/A converters 27, 28 from the controlling circuit 10 is controlled at 4 MHz.

Accordingly, a reproduction brilliance signal, which is the same in the time axis as the record brilliance signal, is reproduced and is output into the second switch 21 from the D/A converter 20. As the second switch 21 is switched into a reproduction contact p at this time, the reproduction brilliance signal of the D/A converter 20 is output from the reproduction contact p of the second switch 21.

Also, the reproduction color difference signals of the R−Y, B−Y, which are the same in the time axis as the record color difference signals of the R−Y, B−Y, are reproduced and output from the D/A converters 27, 28.

Namely, in the example, the time axis compressing and the time-sharing inserting operations of the record brilliance signal and the record color difference signal are respectively performed as in the video tape recorder of the conventional timeplex system during the non-output period of the prohibition gate signal of the recording operation in accordance with the various clock signals to be output from the controlling circuit 10 by a signal processing unit 29. The signal processing unit 29 is composed of the A/D converters 4, 8, and the first and second RAMs 11, 12 on the side of the brilliance data, the switching circuit 13 on the side of the input, the first and second RAMs 15, 16 on the side of the chroma data, the output switching circuit 17, the D/A converters 20, 27, 28, and so on. The time axis compressing and time-sharing inserting operations are stopped during the output period of the prohibition gate signal of the recording operation. The conversion video signal, which is formed by stop-operation for compressing the time axis and inserting the time sharing only on the vertical synchronizing portion of the video signal to be recorded, is recorded on the tape 24. The brilliance signal and the color difference signal of the video signal reproduced from the tape 24 are extended in the time axis as in the video tape recorder of the conventional timeplex system during the non-output of the prohibition gate signal in the reproduction time. The extending operation on the time axis is stopped during the output period of the prohibition gate signal in the reproduction time to reproduce and to form, respectively for each 1 H, the reproduction brilliance signal and the reproduction color difference signal which are the same in the time axis as the record brilliance signal and the recorded color difference signal.

As the inserting operation is effected into the conversion video signal to be recorded on the tape 24, since it is without the time-axis compressing and time-sharing inserting operations only on the vertical synchronizing signal portion of the record brilliance signal, the video signal to be recorded and the video signal reproduced are detached in analog synchronism without being converted in A/D. Thus the horizontal and vertical synchronizing signals can be detected correctly and stably without the shift of the detection timing, by the synchronism detaching circuit 3, to allow the synchronism detachment to be performed. In this case, changes in the edge of the horizontal synchronizing signal to be input into the controlling circuit 10 are not caused. Each clock signal to be output into the signal processing unit 29 from the controlling circuit 10 is controlled in a synchronous relation with the phase of the horizontal synchronizing signal which is correctly and stably detached in synchronism and is variably controlled so that the time axis compressing and time sharing operations during the recording operation and the time axis extending operation during the reproducing operation are correctly and stably performed.

An achromatic signal level latch circuit 31 is adapted to latch A/D conversion output at the timing of t2+(TA2/2) from the leading edge of the horizontal synchronizing signal by a controlling signal M. A subtracting circuit 32 is adapted to subtract the digital output of the latch circuit 31 from the digital output of the A/D converter 4.

Figure 4:
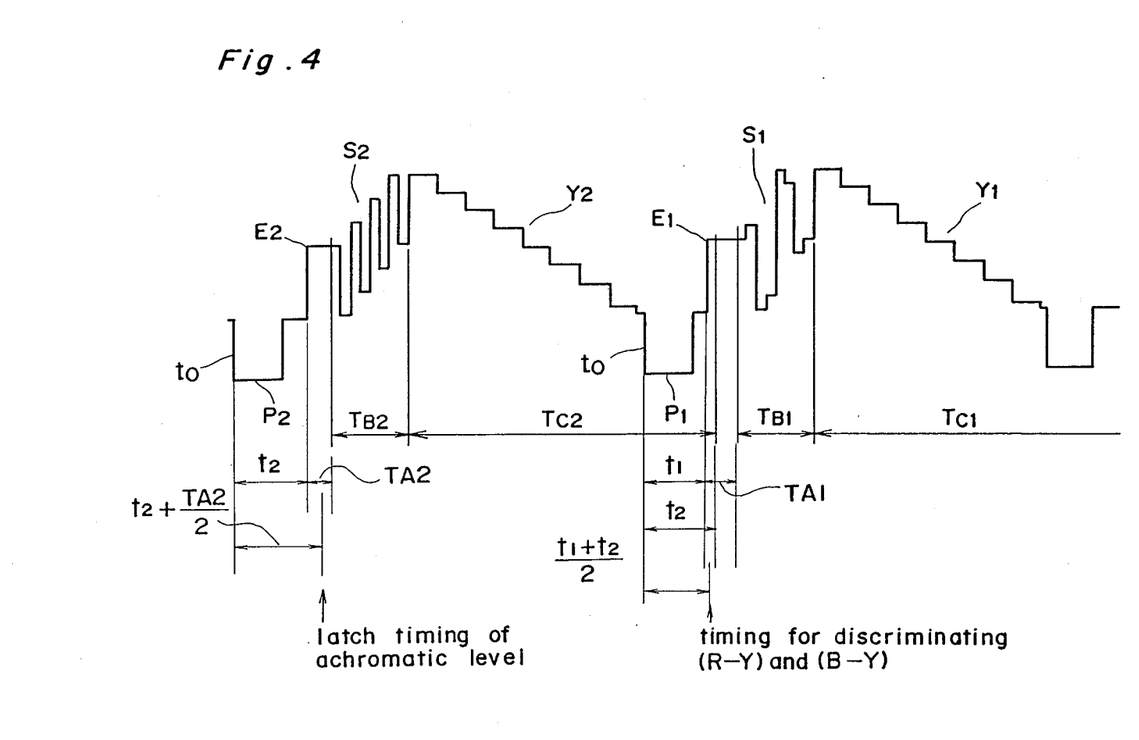
FIG. 4 is waveform chart showing a timeplex signal waveform.

Further detailed description will be given in accordance with the timeplex signal of FIG. 4. The linear consecutive signals of R−Y and B−Y are compressed in the time axis and are piled upon the level of 50 IRE of the brilliance signal including the synchronizing signal. An achromatic signal, which is to identify the B−Y/R−Y, is inserted before the color difference signal, the level being also 50 IRE. In FIG. 4, E1, E2 are respectively indicating signals representing the kind of color difference signals which are inserted into lines, Y1, Y2 are brilliance signals, respectively, and S1, S2 are respectively R−Y and B−Y signals.

An achromatic signal of a period from the time t1 to TA1 is inserted from the leading edge of the horizontal synchronizing signal into the position before the compressed R−Y signal. An achromatic signal of the TA2 period from a time t2 (t2>t1) is inserted from the leading edge of the synchronizing signal into the position before the compressed B−Y signal. It is to be noted that there is the relationship of $t1+TA1=t2+TA2$. The detection of the B−Y/R−Y is performed by either 50 IRE or 0 IRE in the level of the timing of the (t1+t2)/2 from the leading edge of the synchronizing signal. The reproduced color difference signal is extended to the time axis and the level of the 50 IRE portion is subtracted into the original color difference signal.

Figure 6:
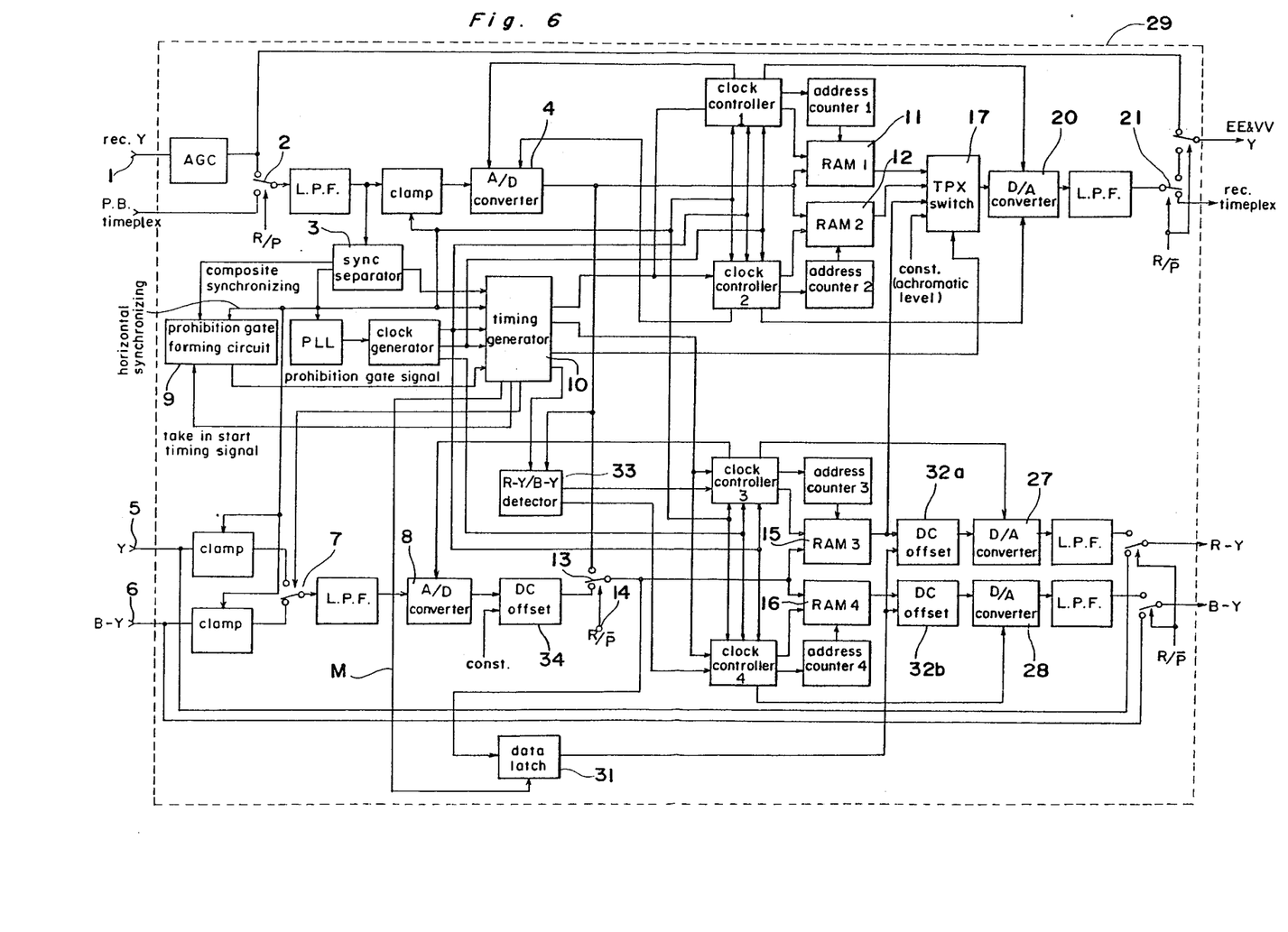
FIG. 6 is a detailed block circuit diagram of the block of FIG. 5.

At this time, the addition and the substraction of the level of the 50 IRE portion are performed by the addition and the subtraction of the fixed digital value of the 50 IRE portion from the A/D converted color difference signal. In the recording, for instance, by means of the DC offset circuit 34, as shown in FIG. 6, the level of 50 IRE is added to the output of A/D converter 8. This is because the digital value of the 50 IRE portion is determined if the input amplitude and the DC level of the A/D converter are provided.

According to the present invention, the digital value after the A/D conversion corresponding to the achromatic signal to be inserted during the recording operation is latched by a latching circuit 31. The digital value corresponding to this achromatic signal is subtracted, by a subtraction circuit 32, from the digital value of the timeplex color difference signal. The correct color difference signal is guided by the extension on the time axis. Namely, the output of the subtraction circuit 32 is stored, by the clock of 20 MHz, in the RAMs 15, 16 and is read by the clock of 4 MHz to perform the extending operation on the time axis. Also, the controlling circuit 10 frames the control signal M in accordance with the horizontal synchronizing signal from the synchronism detecting circuit 3, and frames the clock of the A/D converter 4 and clock of the RAMs 15, 16.

The reproduction timeplex signal input into the terminal 1 is converted into the digital value by the A/D converter 4. As the output of the A/D converter 4 is latched at the timing of t2+(TA2/2) from the leading edge of the horizontal synchronizing signal in FIG. 4 in the latching circuit 31, the level of the achromatic signal immediately before the R−Y signal and B−Y is correctly stored.

The timeplex signal to be input into the A/D converter 4 has some problem of bringing amplitude changes and DC level changes, as described hereinabove, during the production operation. For example, the output of the A/D converter 4 is in the range of the (+xc+xg+Δx) through (−xc+xg+Δx), xg being a digital value corresponding to 50 IRE. As the output existed in the range of the (+xc+xg) through (−xc+xg) during the recording operation, the error of (+Δx) is caused.

On the other hand, the output of the latching circuit 31 also receives the changes likewise so that the output becomes (xg+Δx). As the output of the latching circuit 31 is subtracted from the output of the A/D converter 4 in the subtraction circuit 32, the change portion (+Δx) is offset. The output of the subtractor 32 exists in the range of (+xc) through (−xc), thus resulting in the non-occurrence of the hue error.

Namely, the digital value after the A/D conversion of the achromatic signal changes because of changes in the amplitude and the DC level of the timeplex signal to be input by the A/D converter during the reproduction operation. As the level of the achromatic signal is set in the level of the 50 IRE portion, the latch level of the achromatic signal is subtracted from the digital value of the timeplex color difference signal so that the changes in the amplitude and the DC level during the reproduction operation are offset.

As described hereinabove, according to the present invention, the hue of the reproduction picture face does not change because of the DC level changes, and the amplitude changes of the timeplex signal, thus resulting in a better effect. As shown in FIG. 1, the output (+xc through −xc) of such a subtractor 32 is input into the input switching circuit 13 disposed in front of the first RAM 15 and the second RAM 16. Also, the subtractor 32 may be provided, as a pair 32a, 32b as shown in FIG. 5, respectively between the first RAM 15 and the first D/A converter 27, the second RAM 16 and the second converter 28 so that the operation effect similar to that of FIG. 1 may be provided.

Figure 5:
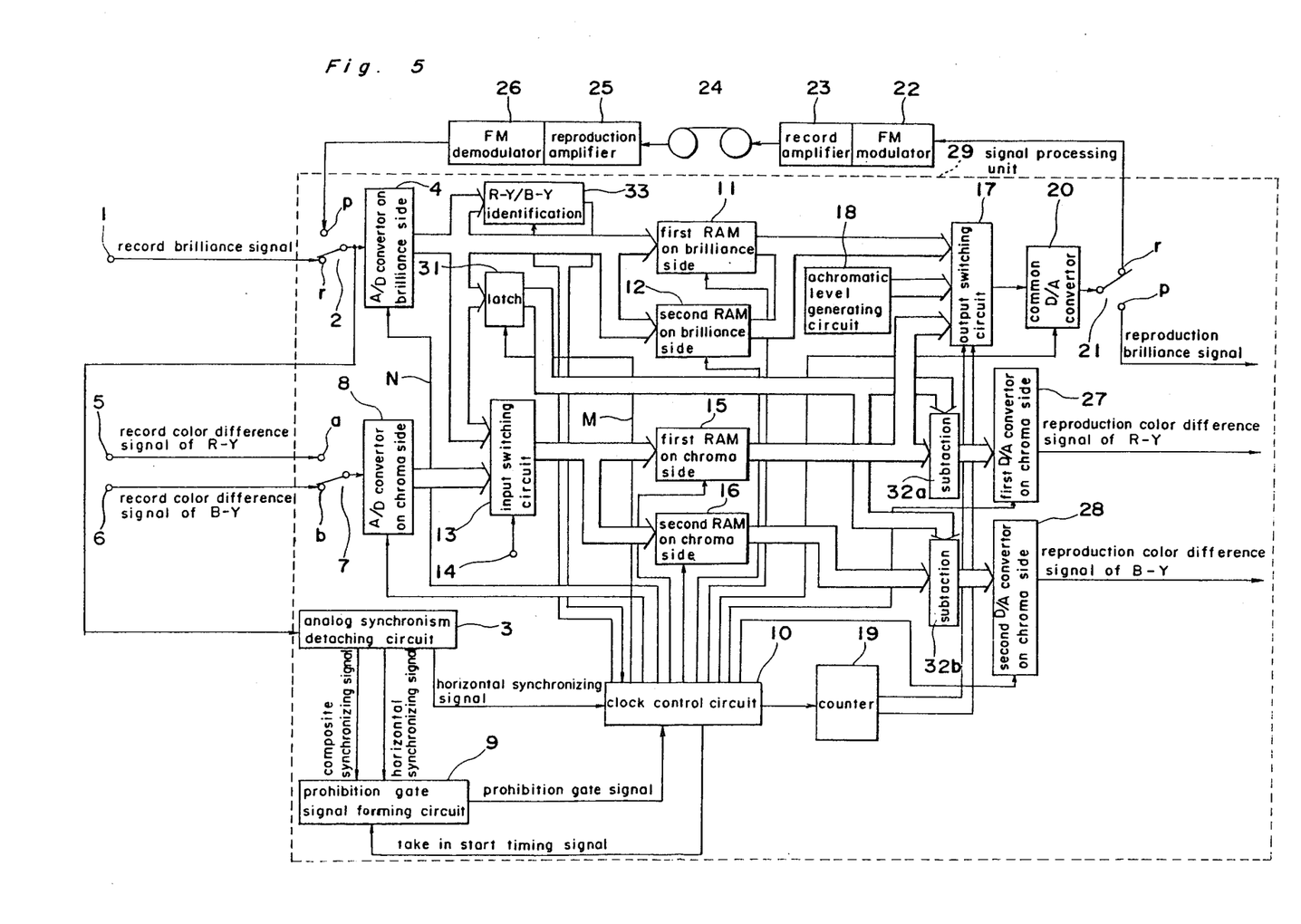
FIG. 5 is a block diagram showing the modified example of FIG. 1.

FIG. 6 exemplary shows an actual detailed block diagram of FIG. 5. In FIG. 6, the blocks which have no corresponding reference numerals to the blocks of FIG. 5 have their names written in the drawing. An identification circuit 33 identifies whether the line includes the R−Y signal or includes the B−Y signal. Namely, it is to discriminate the type of the color difference signals by the low level or the high level of the output of the A/D converter 4 for 1 μs of 7.4 μs through 8.4 μs from the falling t0 of the horizontal synchronizing signals P1, P2. A control signal generating circuit 10 generates a storing control signal for 10.4 μs of 10.8 μs through 21.2 μs (TB1, TB2) from the falling t0 of the horizontal synchronizing signal to be input from the synchronism detaching circuit 3, and generates a read controlling signal for the Tc1, Tc2 of FIG. 4 continued after it. The storing control signal is input into the first and second memories 15, 16, and the reading control signal is input directly into the first and second memories 15, 16.

When the color television signal of FIG. 4 is input into the input terminal 1, the identification circuit 33 is to examine the level of the timing of the (t1+t2)/2 from the leading edge of the synchronizing signal (t0).

When it is determined that this is the high level, the A/D converted color television signal is input into the first memory 15 so that the R−Y signal of the TB period of FIG. 4 is read at high speed by a high speed storing control signal from the control signal generating circuit 10. As the color television signal of FIG. 4 shows only the waveform before it is converted in A/D, it is to be understood that what is recorded is the R−Y signal as a digital value. Assume that the digital value is 6. After the TB period is over, the reading operation is performed in the first and second memories 15, 16 by a low-speed reading signal from the control signal generating circuit 10. At the time, the reading output of the first memory 15 is a R−Y signal stored in the line and the reading output of the second memory 16 is a B−Y signal stored in the line before 1H. When the horizontal synchronizing signal comes after the reading operation, the similar operation is performed. In this case, the identification circuit detects the low level to determine if it is the B−Y signal line, so that the storing control signal from the control signal generating circuit 10 is input only to the second memory 16, but is not input to the first memory 15. Accordingly, the first memory 15 retains the contents, at they are, of the R−Y signal stored at the previous time, and the second memory 16 stores the B−Y signal of the present line instead of the B−Y signal before 2 H stored up to the time. Then, when the reading control signal is input, the R−Y signal from the first memory 15 and the B−Y signal from the second memory 16 are simultaneously a the low speed and are time-extended signals so that they are input into the next-stage of D/A converters 27, 28 and they are output as analog signals. A status RAM which is formed of MOSIC of, for example, 6×208 bits of element number, is used as the memories 15, 16.

According to the present invention, as described hereinabove, the shift register is not required to be used. An inexpensive color signal processing circuit can be provided. Also, since a MOS memory can be used, the consumption of power will be less. Also, since two similar memories may be used, and the addresses may be completely the same in timing and the driving system becomes simpler in terms of the circuit.

Although the present invention has been fully described by way of example with reference to the accompanying drawings, it is to be noted here that various changes and modifications will be apparent to those skilled in the art. Therefore unless otherwise such changes and modifications depart from the scope of the present invention, they should be construed as included therein.

What is claimed is:

1. A video signal recording and reproducing apparatus for recording a timeplex video signal on a recording medium and for reproducing, from said recording medium, said timeplex video signal having a color difference signal superposed into an achromatic signal level, said apparatus comprising:

a DC level offset means for correcting a DC level of color difference signals during reproduction of the recorded timeplex video signal, said DC level offset means for outputting reproduced color difference signals which do not contain variations of the color difference signal DC level causing variation of hue on a reproduced picture, said DC level offset means including A/D converter means for inputting the recorded timeplex video signals to be reproduced and for outputting a converted video signal containing the achromatic signal level when reproduced, latch circuit connected to said A/D converter means, said latch circuit latches said achromatic signal level of said converted video signal during reproducing, and a subtraction circuit connected to said latch circuit, said subtraction circuit provides a difference between said converted video signal and said latched achromatic signal level during reproducing to correct the DC level of color difference signals of said recorded timeplex video signal which is to be produced from said recording medium.

2. A video signal recording and reproducing apparatus in accordance with claim 1, further comprising a conversion circuit which converts the video signal to the timeplex video signal and which converts the timeplex video signal into the video signal, said conversion circuit comprising:

an analog synchronism detaching circuit connected to either a recorded brilliance signal during recording or the reproduced timeplex signal during reproducing, said recorded brilliance signal or said reproduced timeplex signal to be vertically and horizontally synchronously detached by said analog synchronous detaching circuit during recording and reproducing, a prohibition gate signal forming circuit which forms and outputs a prohibition gate signal, said prohibition gate signal forming circuit prohibits said video signal to be compressed during recording and prohibits said recorded video signal from being expanded during reproducing, said prohibition gate signal being formed based on an output synchronizing signal from the analog synchronous detaching circuit, said output synchronizing signal being based on the recorded brilliance signal or the reproduced timeplex signal input to the analog synchronous detaching circuit, said prohibition gate signal output in response to a vertical synchronization signal portion of said synchronizing signal, said prohibition gate signal prohibiting compression and expansion in a period of the vertical synchronizing signal portion of said synchronizing signal output from said analog synchronism detaching circuit, a clock controlling circuit connected to said A/D converter means and said analog synchronous detaching circuit, said clock controlling circuit forming clock signals, which are synchronized in phase with the synchronizing signal output from said analog synchronism detaching circuit, said clock signals are variable in frequency in accordance with a time-axis compressing and a time-sharing inserting operations of said apparatus, a time-axis expanding operation occurring during a non-output period of said prohibition gate signal, and is controlled by a frequency of said time-axis compressing and time-sharing inserting operations, said time-axis expanding operation not occurring in the output period of said prohibition gate signal, a signal processing unit connected to said clock controlling circuit, said signal processing unit having the recorded video signal during recording or the timeplex video signal during reproducing, to respectively perform said time-axis compressing and time-sharing inserting operations, and said time-axis expanding operation in the non-output period of said prohibition gate signal in accordance with the clock signal output from said clock controlling circuit, said signal processing unit to respectively stop said time-axis compressing and time-sharing inserting operations, and said time-axis expanding operation in the output period of said prohibition gate signal so that either the brilliance signal of said video signal to be recorded or said reproduced video signal is unaffected during the vertical synchronizing period.

3. A video signal recording and reproducing apparatus in accordance with claim 1, comprising a first memory connected to said A/D converter means for storing a first color difference signal, a second memory connected to said A/D converter means for storing a second color difference signal, a control signal generating means which is to output a high-speed storing control signal and a low-speed reading control signal at a given timing in response to a horizontal synchronizing signal from said video signal, which is to be reproduced.

4. A video signal recording and reproducing apparatus in accordance with claim 3, wherein the first color difference signal to be stored in the first memory is a $R-Y$ signal, the second color difference signal is a $B-Y$ signal.

5. A video signal recording and reproducing apparatus for recording a timeplex video signal on a recording medium and for reproducing, from said recording medium, said timeplex video signal having a color difference signal superposed into an achromatic signal level, said apparatus comprising:

a conversion circuit for converting a video signal to the timeplex video signal and for converting the timeplex video signal to the video signal, said conversion circuit including an analog synchronism detaching circuit connected to either a recorded brilliance signal during recording or a reproduced timeplex signal during reproducing, said recorded brilliance signal or said reproduced timeplex signal to be vertically and horizontally synchronous detached by said analog synchronous detaching circuit during recording and reproducing, a prohibition gate signal forming circuit which forms and outputs a prohibition gate signal for prohibiting said video signal to be compressed during recording and for prohibiting said recorded video signal from being expanded during reproducing, said prohibition gate signal being formed based on an output synchronizing signal from the analog synchronous detaching circuit, said synchronizing signal being based on the recorded brilliance signal or reproduced timeplex video signal output to the analog synchronous detaching circuit, said prohibition gate signal being output in response to a vertical synchronizing signal portion of the synchronizing signal, said prohibition gate signal prohibiting compression and extension in a period of vertical synchronizing signal portion of said synchronizing signal output from said analog synchronism detaching circuit, a clock controlling circuit connected to said analog synchronism detaching circuit and a A/D converter means, said clock controlling circuit forming clock signals, which are synchronized in phase with the synchronizing signal output from said analog synchronism detaching circuit, said clock signals are variable in frequency in accordance with a time-axis compressing and a time-sharing inserting operations of said apparatus, a time-axis expanding operation occurring during a non-output period of said prohibition gate signal, and are controlled by a frequency of said time-axis compressing and time-sharing inserting operations, said time-axis expanding operation not occurring in the output period of said prohibition gate signal, a signal processing unit connected to said clock controlling circuit, said signal processing unit having the recorded video signal during recording or the timeplex video signal during reproducing input thereto, to respectively perform said time-axis compressing and time-sharing inserting operations, and said time-axis expanding operation in the non-output period of said prohibition gate signal in accordance with the clock signal output from said clock controlling circuit, said signal processing unit to respectively stop said time-axis compressing and time-sharing inserting operations, and said time-axis expanding operation in the output period of said prohibition gate signal so that either the brilliance signal of said video signal to be recorded or said reproduced video signal is unaffected during the vertical synchronizing period; and a DC level offset means for correcting a DC level of said color difference signals during reproduction of the recorded timeplex video signal, said DC level offset means for outputting reproduced color different signals which do not contain variations of the color difference signal DC level causing the variation of hue on the reproduced picture, said DC level offset means including said A/D converter means for inputting the recorded timeplex video signals to be reproduced and for outputting a converted video signal containing an achromatic signal level during reproducing, latch circuit connected to said A/D converter means, said latch circuit latches said achromatic signal level of said converted video signal during reproducing, and a subtraction circuit connected to said latch circuit, said subtraction circuit for providing a difference between said converted video signal and said latched achromatic signal level during reproducing to correct the DC level of color difference signals of said recorded timeplex video signal which is to be reproduced from said recording medium.

6. A video signal recording and reproducing apparatus for recording a timeplex video signal on a recording medium and for reproducing said timeplex video signal from said recording medium, said apparatus comprising:

first switching means for receiving input record color difference signal at the time of recording, said first switching means being switched for each horizontal period;

second switching means for receiving input record brilliance signals at the time of recording and for receiving said timeplex video signal data at the time of reproducing;

analog synchronism detaching circuit receives said record brilliance signals and said timeplex video signal from said second switching means during recording and reproducing and outputs composite synchronized signals and horizontal synchronized signals;

first A/D converter receives record brilliance signals during recording and receives said timeplex video signal during reproducing from said second switching means, said first A/D converter outputs brilliance data during recording, said first A/D converter outputs said timeplex video signal during reproducing;

second A/D converter receives record color difference signals during recording from said first switching means, said second A/D converter outputs record chroma data during recording;

prohibition gate signal forming circuit receives said composite synchronized signals and horizontal synchronized signals from said analog synchronism detaching circuit, said prohibition gate signal forming circuit outputs a prohibition gate signal which prohibits said record brilliance signals and said record color difference signals from being compressed during recording and which prohibits said compressed brilliance data and said compressed chroma data from being expanded during reproducing during a vertical synchronized signal portion of said record brilliance signal and said timeplex video signal;

clock control circuit receives said horizontal synchronized signals from said analog synchronism detaching circuit, receives said prohibition gate signal from said prohibition gate signal forming circuit and outputs a clock signal synchronized in phase with said horizontal synchronized signals from said analog synchronism detaching circuit, said clock signal being output to said first and second A/D converters;

first memory means for receiving brilliance data during recording and for receiving compressed brilliance data during reproducing from said first A/D converter and for receiving clock signals from said clock controlling circuit, said clock signals control said first memory means to store and to read during each horizontal period to compress the record brilliance data on a time axis during recording, and said clock signals control said first memory means to store and to read during each horizontal period to expand said compressed brilliance data during reproducing;

input switching circuit receives compressed chroma data from said first A/D converter during reproducing, receives record chroma data during recording from said second A/D converter, said input switching circuit selectively outputting record chroma data during recording or compressed chroma data during reproducing by a controlling signal;

second memory means connected to said input switching circuit for receiving compressed chroma data from said input switching circuit during reproducing and record chroma data during recording, and for receiving clock signals from said clock controlling circuit, said clock signals control said second memory to store and to read said record chroma data during each horizontal period to compress the record chroma data on a time axis during recording, said clock signals control said second memory to store and to read said compressed chroma data during each horizontal period to expand the compressed chroma data during reproducing, said compressed chroma data being read during a blanking period of the record brilliance signal during recording;

achromatic signal level latch circuit receives control signals from said clock controlling circuit during reproducing and receives timeplex video data from said first A/D converter during reproducing, said achromatic level latch circuit latches said first A/D converter output for a predetermined interval from a leading edge of said horizontal synchronized signals during reproducing;

subtraction circuit subtracts an output of said latch circuit from the output of said first A/D converter during reproducing to produce a corrected color difference signal which is input to said input switching circuit and which is stored in said second memory means, said corrected color difference signal being used during expansion of said chroma data during reproducing;

counter means for receiving a control signal from said clock control signal circuit and for outputting a signal indicating when brilliance data is output, when chroma data is output and when neither brilliance nor chroma data is output during recording, said counter means indicating brilliance data to be output during reproducing;

achromatic level generating circuit outputs an achromatic level during recording;

an outputting switch circuit receives brilliance data and chroma data from said first and second memory means and receives said achromatic level from the achromatic level generating circuit and receives data from said counter means, said output switching circuit selectively outputting brilliance data, chroma data and achromatic level based on said counter means output during recording and outputting brilliance data during reproducing;

D/A converter means for receiving output signals from the output switching circuit and outputs timeplex video signals of time shared brilliance data, achromatic level and chroma data for a horizontal period based on the clock signal from said clock control circuit during recording, said D/A converter means for receiving brilliance data from said output switching circuit during reproducing, said D/A converter means outputting said timeplex video signal during recording and outputting reproduced brilliance signals during reproducing;

third switching means for receiving said output from said D/A converter means and outputting said timeplex video signals to said recording medium during recording and outputting reproduced brilliance signals during reproducing, said achromatic signal level latch circuit and said subtraction circuit for correcting the DC level of the color difference signal during reproduction of the timeplex video signal to provide reproduced color difference signals which do not contain variations of the color difference signal DC level causing the variation of hue on the reproduced picture.

* * * * *